(12) United States Patent
Ding

(10) Patent No.: US 7,958,220 B2
(45) Date of Patent: Jun. 7, 2011

(54) APPARATUS, METHOD AND SYSTEM FOR ACQUIRING IPV6 ADDRESS

(75) Inventor: Changhai Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 12/205,822

(22) Filed: Sep. 5, 2008

(65) Prior Publication Data

US 2008/0320115 A1 Dec. 25, 2008

Related U.S. Application Data

(63) Continuation of application No. PCT/CN2006/003576, filed on Dec. 25, 2006.

(30) Foreign Application Priority Data

Mar. 6, 2006 (CN) .......................... 2006 1 0056741
Mar. 6, 2006 (CN) .......................... 2006 1 0056750

(51) Int. Cl.
*G06F 15/173* (2006.01)

(52) U.S. Cl. ........ 709/223; 709/232; 709/236; 370/328; 370/329

(58) Field of Classification Search .................. 709/223, 709/224, 232, 236, 238; 370/328, 329
See application file for complete search history.

(56) References Cited

U.S. PATENT DOCUMENTS

| | | | |
|---|---|---|---|
| 6,959,009 B2 | 10/2005 | Asokan et al. | |
| 7,463,614 B2 * | 12/2008 | Bhatia et al. | 370/338 |
| 2001/0017856 A1 | 8/2001 | Asokan et al. | |
| 2003/0204635 A1 | 10/2003 | Ko et al. | |
| 2004/0184465 A1 | 9/2004 | Lee et al. | |
| 2004/0213237 A1 * | 10/2004 | Yasue et al. | 370/392 |
| 2005/0027778 A1 | 2/2005 | Dimitrelis et al. | |
| 2005/0027834 A1 * | 2/2005 | Chen et al. | 709/222 |
| 2005/0220144 A1 | 10/2005 | Ishiyama et al. | |
| 2005/0271034 A1 | 12/2005 | Asokan et al. | |

(Continued)

FOREIGN PATENT DOCUMENTS

CN 1453962 A 5/2003

(Continued)

OTHER PUBLICATIONS

Droms et al., "Dynamic Host Configuration Protocol for IPv6 (DHCPv6)," *IETF Standard*, RFC3315 : 1-90 (Jul. 2003).

(Continued)

*Primary Examiner* — Lashonda T Jacobs
(74) *Attorney, Agent, or Firm* — Leydig, Voit & Mayer, Ltd.

(57) ABSTRACT

An apparatus, method and system for acquiring IPV6 address is described. The apparatus includes a request module (101) and an allocation module (102), the request module (101) is adapted to send an IPV6 address allocation request to the allocation module (102), and acquire an allocated IPV6 address from an IPV6 address allocation acknowledgement returned from the allocation module (102); the allocation module (102) is adapted to allocate an IPV6 address according to the IPV6 address allocation request, make the allocated IPV6 address to be carried in the IPV6 address allocation acknowledgement, and return the IPV6 address allocation acknowledgement to the request module (101). The system includes a user terminal and an IPV6 address management device. The apparatus, method and system improve the security of IPV6 address in use while ensure the uniqueness of IPV6 address.

19 Claims, 3 Drawing Sheets

U.S. PATENT DOCUMENTS

| | | | | |
|---|---|---|---|---|
| 2006/0029014 A1* | 2/2006 | Maturi | ............................ | 370/328 |
| 2006/0133301 A1* | 6/2006 | Bhatia et al. | ................... | 370/278 |
| 2007/0058582 A1* | 3/2007 | Park et al. | ....................... | 370/329 |
| 2007/0274266 A1* | 11/2007 | Oyama et al. | ................. | 370/335 |
| 2008/0307079 A1* | 12/2008 | Choi et al. | .................... | 709/223 |
| 2009/0073919 A1* | 3/2009 | Chen | .............................. | 370/328 |

FOREIGN PATENT DOCUMENTS

| | | | |
|---|---|---|---|
| CN | 1625275 | A | 8/2005 |
| JP | 2002-261806 | A | 9/2002 |
| JP | 2004-104703 | A | 4/2004 |
| JP | 2006-5606 | A | 1/2006 |
| KR | 20020055848 | A | 10/2002 |
| WO | WO 2004-084492 | A1 | 9/2004 |

OTHER PUBLICATIONS

Haberman et al., Automatic Prefix Delegation Protocol for Internet Protocol Version 6 (IPv6), *IETF—Working Draft*, 1-9 (Feb. 2002) http://draft-haberman-ipngwg-auto-prefix-02.txt.

Hinden et al., "Internet Protocol Version 6 (IPv6) Addressing Architecture," *IETF Standard*, RFC3513:1-26 (Apr. 2003).

Lee et al., "Implementation of IPv6 Prefix Delegation Mechanism Using DHCPv6 Protocol," *IEEE—Advanced Communication Technology*, 1(7): 635-640 (Feb. 2005).

Internet Engineering Task Force, "IP Version 6 over PPP," Internet Standards Track Protocol (Dec. 1998).

Internet Engineering Task Force, "IPv6 Stateless Address Autoconfiguration," Internet Standards Track Protocol (Dec. 1998).

Internet Engineering Task Force, "Neighbor Discovery for IP Version 6 (IPv6)," Internet Standards Track Protocol (Dec. 1998).

State Intellectual Property Office of the People's Republic of China, First Examination Report in Chinese Patent Application No. 200610056741.7 (Nov. 7, 2008).

State Intellectual Property Office of the People's Republic of China, First Examination Report in Chinese Patent Application No. 200610056750.6 (Nov. 7, 2008).

$2^{nd}$ Office Action in corresponding European Application No. 06 840 627.1 (Sep. 27, 2010).

$1^{st}$ Office Action in corresponding Japanese Application No. 2008-557557 (Oct. 12, 2010).

Haberman et al., "Automatic Prefix Delegation Protocol for Internet Protocol Version 6 (IPv6)," Individual Submission Internet Draft, Feb. 2002, Sanface Software, New York, New York.

Haskin et al., "RFC 2472—IP Version 6 over PPP," Network Working Group, Dec. 1998, The Internet Society, Reston, Virginia.

Nishimura, "IP address administration in preparation for ubiquitous generation," Computer & Network Lan, Jun. 22, 2004, pp. 82-90, vol. 22, No. 7, Omsha, Japan.

Decision of Refusal in corresponding Japanese Application No. 2008-557577 (Mar. 8, 2011).

Written Opinion of the International Searching Authority in corresponding PCT Application No. PCT/CN2006/003576 (Apr. 5, 2007).

Wen et al., "The Deployment of IPv6 stateless auto-configuration in access network," $8^{th}$ International Conference on Telecommunications, Jun. 15-17, 2005, ConTEL 2005, Zagreb, China.

\* cited by examiner

APPARATUS, METHOD AND SYSTEM FOR ACQUIRING IPV6 ADDRESS

CROSS-REFERENCE TO RELATED APPLICATION

This application is a continuation of International Patent Application No. PCT/CN2006/003576, filed Dec. 25, 2006, which claims priority to Chinese Patent Application No. 200610056750.6, filed Mar. 6, 2006, and Chinese Patent Application No. 200610056741.7, filed Mar. 6, 2006, each of which is hereby incorporated by reference in its entirety.

FIELD OF THE INVENTION

The present invention relates to broadband access technology, particularly, to an apparatus, method and system for acquiring an Internet Protocol Version 6 (IPV6) address.

BACKGROUND

The 32-bit IPV4 address resources become insufficient increasingly as the size of Internet becomes larger and larger. In order to solve the problem once and forever, the Internet Engineering Task Force (IETF) is proposed to employ 128-bit IPV6 address in the IPV6 protocol.

The existing protocol only defines the IPV6 address but does not define the specific manner for a user terminal to acquire an IPV6 address, so that the approach for a user terminal to acquire an IPV6 address is out of control and management, which results in security vulnerabilities easily, for example, the threat of imitational user terminals, and so on.

SUMMARY

The present invention provides an apparatus, method and system for acquiring an IPV6 address.

According to one aspect of the invention, an apparatus for acquiring IPV6 address is provided, the apparatus includes a request module and an allocation module; the request module is adapted to send an IPV6 address allocation request to the allocation module, and acquire an allocated IPV6 address from an IPV6 address allocation acknowledgement returned from the allocation module; the allocation module is adapted to allocate the IPV6 address according to the IPV6 address allocation request, and make the allocated IPV6 address to be carried in the IPV6 address allocation acknowledgement for returning to the request module.

According to another aspect of the invention, a method for acquiring an IPV6 address is provided, the method includes: receiving an IPV6 address allocation request sent from a user terminal, allocating an IPV6 address for the user terminal according to the IPV6 address allocation request, and returning an IPV6 address allocation acknowledgement carrying the allocated IPV6 address to the user terminal.

According to another aspect of the invention, a system for allocating IPV6 address is provided, the system includes a user terminal and an IPV6 address management device; the user terminal is adapted to send an IPV6 address allocation request, and acquire an allocated IPV6 address from an received IPV6 address allocation acknowledgement; the IPV6 address management device is adapted to receive the IPV6 address allocation request, allocate the IPV6 address according to the IPV6 address allocation request, and send the IPV6 address allocation acknowledgement carrying the allocated IPV6 address to the user terminal.

It can be seen from above technical solutions in the apparatus, method and system for acquiring IPV6 address, according to the invention, IPV6 addresses are allocated to user terminals uniformly by a Broadband Remote Access Server (BRAS) or a network server, so that the BRAS or network server is allowed to effectively arrange and manage the IPV6 address, improving the security of IPV6 address in use and decreasing the probability of appearing imitational user terminals in Internet while ensuring the uniqueness of IPV6 address.

DETAILED DESCRIPTION

The present invention is described in detail with specific embodiments in the accompanying drawings.

In embodiments of the present invention, a BRAS or a network server is responsible for performing uniform arrangement and management for IPV6 address and providing IPV6 address according to a request from a user terminal, so as to improve the security of IPV6 address in use. In the following description, an IPV6 address may simply refer to an IPV6 prefix, or simply refer to an IPV6 interface identification (ID), or include both the IPV6 prefix and the IPV6 interface ID.

The network server may be a Remote Authentication Dial In User Service (RADIUS) server, a Terminal Access Controller Access Control System (TACACS) server, or a Dynamic Host Configure Protocol (DHCP) server, and so on.

Figure 1:
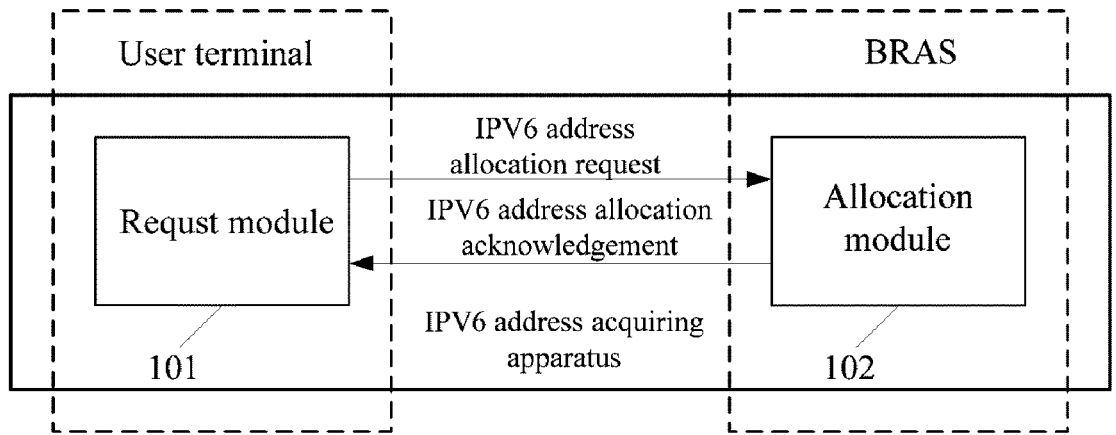
FIG. 1 is a structure diagram illustrating an apparatus for acquiring IPV6 address according to an embodiment of the invention.

In an embodiment of the invention, a BRAS is responsible for performing uniform arrangement and management for IPV6 address and allocating IPV6 address according to a request from a user terminal. FIG. 1 is a structure diagram illustrating an apparatus for acquiring IPV6 address according to the embodiment. The apparatus includes a request module 101 and an allocation module 102. The request module 101 is set in a user terminal, and the allocation module 102 is set in a BRAS. The request module 101 and the allocation module 102 interact with each other via Internet.

The request module 101 sends an IPV6 address allocation request to the allocation module 102, and acquires an allocated IPV6 address from an IPV6 address allocation acknowledgement returned from the allocation module 102.

The allocation module 102 determines the IPV6 address according to a strategy, and informs the request module 101 of the allocated IPV6 address via an IPV6 address allocation acknowledgement.

If the IPV6 address refers to an IPV6 prefix, since the allocation module 102 may set at least one IPV6 prefix in advance for every interface or every Internet Service Provider (ISP) domain, the method for determining the IPV6 prefix according to the strategy includes: after identifying an interface or ISP domain to which the user terminal belongs, the allocation module 102 acquires the IPV6 prefix of the interface or the ISP domain set by the allocation module 102 itself. What is set in advance by the allocation module 102 may also be attribute information of the IPV6 prefix, including prefix address, length, preferred lifetime, valid lifetime, autoconfiguration (L/A) label, and so on. The prefix address is the IPV6 prefix. The length, preferred lifetime, valid lifetime, L/A label and so on are additional information of the IPV6 prefix.

If the IPV6 address refers to an IPV6 interface ID, there are various methods for the allocation module 102 to determine the IPV6 interface ID according to a strategy. For example, the allocation module 102 selects an IPV6 interface ID for a user terminal based on an interface or ISP domain to which the user terminal belongs, or generates an IPV6 interface ID using a random number or a MAC address of the user terminal. In practical application, strategies for determining an IPV6 interface ID are flexible, and no more description will be given.

Figure 2:
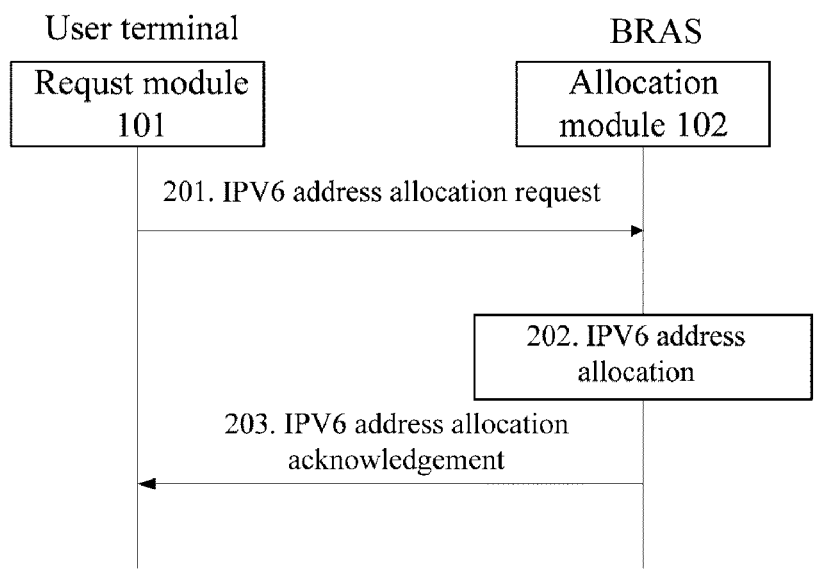
FIG. 2 is a flowchart diagram illustrating a method for acquiring IPV6 address with the apparatus as shown in FIG. 1.

FIG. 2 is a flowchart diagram illustrating a method for acquiring IPV6 address according to an embodiment of the invention. The method includes the following steps.

Step 201: A request module 101 at a user terminal sends an IPV6 address allocation request to an allocation module 102 at a BRAS.

Step 202: The allocation module 102 allocates an IPV6 address for the request module 101.

At this step, if the IPV6 address is an IPV6 prefix, the allocation module 102 identifies an interface or ISP domain to which the user terminal containing the request module 101 belongs, and then searches for attribute information of the IPV6 prefix set for the interface or the ISP domain by the allocation module 102 itself.

If the IPV6 address is an IPV6 interface ID, before the request module 101 requests to acquire the IPV6 interface ID, the BRAS typically has performed authentication for the user terminal and has recorded information of the user terminal such as user name, MAC address, interface or ISP domain to which the user terminal belongs, and so on. When allocating the IPV6 interface ID, the BRAS may generate the IPV6 interface ID using a random number and/or the MAC address of the user terminal, or select an IPV6 interface ID for the user terminal based on the interface or ISP domain to which the user terminal belongs.

Step 203: The allocation module 102 returns an IPV6 address allocation acknowledgement to the request module 101, the IPV6 address allocation acknowledgement carrying the allocated IPV6 address.

Figure 3:
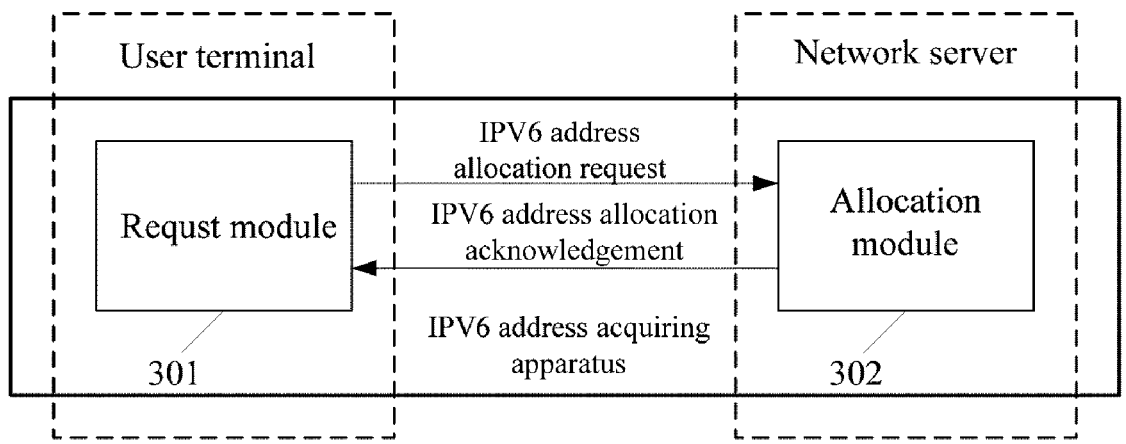
FIG. 3 is a structure diagram illustrating an apparatus for acquiring IPV6 address according to another embodiment of the invention.

In another embodiment of the invention, a network server is responsible for performing uniform arrangement and management for IPV6 address and allocating IPV6 address according to a request from a user terminal. FIG. 3 is a structure diagram illustrating an apparatus for acquiring IPV6 address according to the embodiment. The apparatus includes a request module 301 and an allocation module 302. The request module 301 is set in a user terminal, and the allocation module 302 is set in a network server. The request module 301 and the allocation module 302 interact with each other via Internet. In practice, the request module 301 and the allocation module 302 may interact with each other via a BRAS or without a BRAS, so the BRAS is not shown in FIG. 3.

Figure 4:
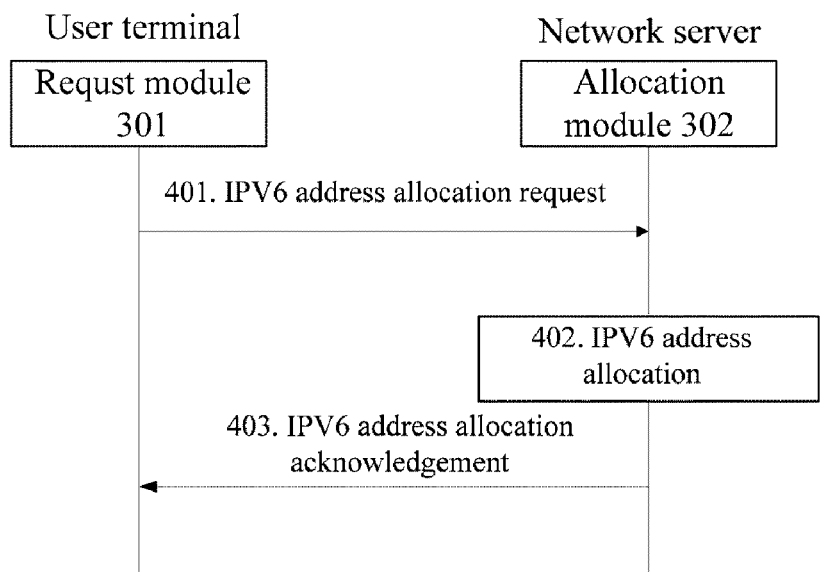
FIG. 4 is a flowchart diagram illustrating a method for acquiring IPV6 address with the apparatus as shown in FIG. 3.

FIG. 4 is a flowchart diagram illustrating a method for acquiring IPV6 address according to another embodiment of the invention. The method includes:

Step 401: A request module 301 at a user terminal sends an IPV6 address allocation request to an allocation module 302 at a network server.

At this step, the request module 301 may send the IPV6 address allocation request to the allocation module 302 via a BRAS or directly without a BRAS. In a specific example of the invention, when the IPV6 address allocation request is sent via the BRAS, the BRAS may perform authentication on the user terminal which sends the request, and send the request to the allocation module 302 after a successful authentication.

Step 402: The allocation module 302 allocates an IPV6 address for the request module 301. This step is similar to step 202. If the IPV6 address is an IPV6 prefix, the allocation module 302 determines the IPV6 prefix based on the interface or ISP domain to which the user terminal containing the request module 301 belongs. If the IPV6 address is an IPV6 interface ID, the allocation module 302 generates the IPV6 interface ID using a random number and/or the MAC address of the user terminal.

Step 403: The allocation module 302 returns an IPV6 address allocation acknowledgement to the request module 301, the IPV6 address allocation acknowledgement carrying the allocated IPV6 address.

Similarly, the IPV6 address allocation acknowledgement may also be returned to the request module 301 via the BRAS or directly without the BRAS.

Figure 5:
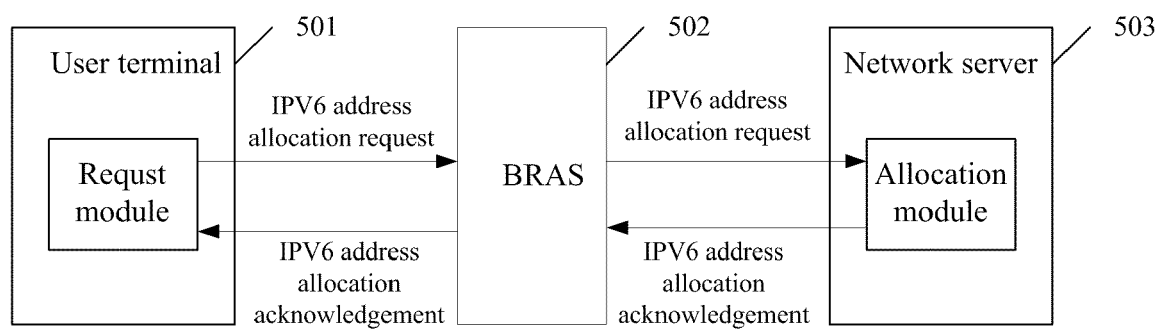
FIG. 5 is a structure diagram illustrating a system for allocating IPV6 address according to an embodiment of the invention.

FIG. 5 is a structure diagram illustrating a system for allocating IPV6 address according to another embodiment of the invention. The system includes a user terminal 501 and a BRAS 502.

The user terminal 501 is further provided with a request module other than functions of a common user terminal. The request module sends an IPV6 address allocation request, receives an IPV6 address allocation acknowledgement, and acquires a desired IPV6 address from the acknowledgement. The BRAS 502 determines the IPV6 address according to the IPV6 address allocation request, and returns the determined IPV6 address to the user terminal 501 via the IPV6 address allocation acknowledgement.

In a specific example of the invention, the system may be further provided with a network server 503. The network server 503 receives an IPV6 address allocation request and allocates an IPV6 address. At this time, the BRAS 502 forwards the IPV6 address allocation request and the IPV6 address allocation acknowledgement between the user terminal 501 and the network server 503. In another specific example of the invention, the user terminal 501 may interact directly with the network server 503 without the BRAS 502.

In other words, either of the network server and the BRAS may have the function of uniform arrangement and management for IPV6 address. A device having the function of uniform arrangement and management for IPV6 address is called as an IPV6 address management device.

In the system for allocating IPV6 address as shown in FIG. 5, if the IPV6 prefix set for an interface or ISP domain by an IPV6 address management device changes, the IPV6 address management device may periodically send IPV6 address allocation acknowledgements to all user terminals belonging to the interface or ISP domain, the IPV6 address allocation acknowledgements carrying changed attribute information of the IPV6 prefix. The change of the IPV6 prefix refers to deletion of the current set IPV6 prefix or addition of a new IPV6 prefix, and so on. Further, if a user terminal switches to another interface or ISP domain, the user terminal may send an IPV6 address allocation request to the IPV6 address allocation management device.

In embodiments of the invention, the IPV6 address management device allocates different IPV6 prefixes for user terminals belonging to different ISP domains, so that the possibility of address conflict decreases. All user terminals belonging to a same ISP domain use a same IPV6 address, so that routings of these user terminals may be collected with the IPV6 prefix and then performed, which results in the decrease of routing amount of the Internet. Moreover, once the IPV6 prefix of an ISP domain changes or a user terminal switches to another ISP domain, the user terminal may readily acquire a new IPV6 prefix from an IPV6 address management device.

Embodiments of the invention are applicable to any kinds of user terminal, such as Neighbor Discovery Protocol (NDP) user terminal, Point-to-Point Protocol (PPP) user terminal, Dynamic Host Configure Protocol (DHCP) user terminal, Extensible Authentication Protocol (EAP) user terminal, or Layer 2 Tunneling Protocol (L2TP) user terminal, and so on.

Different kinds of user terminals have different requirements for acquiring IPV6 address.

For example, an IPV6 interface ID of an IPV6 address used by an NDP user terminal is generated randomly by the NDP user terminal. The NDP user terminal needs acquire an IPV6 prefix from an IPV6 address management device.

For example, a PPP user terminal needs acquire both an IPV6 prefix and an IPV6 interface ID from an IPV6 address management device, but the IPV6 prefix and the IPV6 interface ID are acquired separately.

In a specific example, a PPP user terminal may send an IPV6 prefix allocation request and an IPV6 interface ID allocation request to an IPV6 address management device, the IPV6 address management device separately allocates an IPV6 prefix and an IPV6 interface ID after receiving the two requests, and returns the IPV6 prefix via an IPV6 prefix allocation acknowledgement and the IPV6 interface ID via an IPV6 interface ID allocation acknowledgement to the PPP user terminal, the IPV6 prefix allocation acknowledgement carrying attribute information of the IPV6 prefix and the IPV6 interface ID allocation acknowledgement carrying the IPV6 interface ID.

For example, an IPV6 prefix and an IPV6 interface ID of an IPV6 address used by a DHCP user terminal supporting IPV6 are also acquired from an IPV6 address management device. In a specific example, the DHCP user terminal may send an IPV6 address allocation request to the IPV6 address management device, the IPV6 address management device allocates an IPV6 prefix and an IPV6 interface ID according to the request, and returns an IPV6 address allocation acknowledgement to the DHCP user terminal, the IPV6 address allocation acknowledgement carrying both the IPV6 prefix and the IPV6 interface ID.

In above process, the IPV6 address management device should guarantee that the allocated IPV6 address is unique. For example, when two user terminals have the same IPV6 prefix, they should be allocated with different IPV6 interface ID. On the contrary, when two user terminals have different IPV6 prefixes, the IPV6 address management device may allocate the same IPV6 interface ID for them.

The preferred embodiments described herein intends to illustrate the invention, rather than limit the protect scope of the invention.

What is claimed is:

1. An apparatus for acquiring an IPV6 address, comprising a request module and an allocation module, wherein,
   the request module is adapted to send an IPV6 address allocation request to the allocation module, and acquire an allocated IPV6 address from an IPV6 address allocation acknowledgement returned from the allocation module;
   the allocation module is adapted to allocate the IPV6 address according to the IPV6 address allocation request, and make the allocated IPV6 address to be carried in the IPV6 address allocation acknowledgement for returning to the request module;
   wherein the IPV6 address comprises at least one of an IPV6 prefix and an IPV6 interface identification;
   wherein the IPV6 prefix is determined by the allocation module based on an interface or Internet Service Provider (ISP) domain to which a user terminal containing the request module belongs; and
   the IPV6 interface ID is selected by the allocation module based on the interface or the ISP domain to which the user terminal belongs.

2. The apparatus of claim 1, wherein the request module is set in the user terminal, and the allocation module is set in a Broadband Remote Access Server (BRAS) or a network server.

3. The apparatus of claim 2, wherein the network server comprises a Remote Authentication Dial In User Service (RADIUS) server, a Terminal Access Controller Access Control System (TACACS) server, or a Dynamic Host Configure Protocol (DHCP) server.

4. The apparatus of claim 2, wherein the user terminal comprises a Neighbor Discovery Protocol (NDP) user terminal, a Point-to-Point Protocol (PPP) user terminal, a Dynamic Host Configure Protocol (DHCP) user terminal, an Extensible Authentication Protocol (EAP) user terminal, or a Layer 2 Tunneling Protocol (L2TP) user terminal.

5. A method for acquiring an IPV6 address, comprising:
   receiving an IPV6 address allocation request sent from a user terminal;
   allocating an IPV6 address for the user terminal according to the IPV6 address allocation request, and returning an IPV6 address allocation acknowledgement carrying the allocated IPV6 address to the user terminal;
   wherein the IPV6 address comprises at least one of an IPV6 prefix and an IPV6 interface identification;
   wherein the IPV6 prefix is determined by the allocation module based on an interface or Internet Service Provider (ISP) domain to which a user terminal containing the request module belongs; and
   the IPV6 interface ID is selected by the allocation module based on the interface or the ISP domain to which the user terminal belongs.

6. The method of claim 5, wherein when the IPV6 address is the IPV6 prefix;
   allocating an IPV6 address for the user terminal comprises:
   setting in advance attribute information of the IPV6 prefix for an interface or ISP domain, identifying the interface or ISP domain to which the user terminal belongs after receiving the IPV6 address allocation request, and acquiring the attribute information of the IPV6 prefix set for the interface or ISP domain by itself.

7. The method of claim 6, further comprising:
   updating the IPV6 prefix set for the interface or ISP domain by itself, and sending the updated IPV6 prefix to user terminals belonging to the interface or ISP domain.

8. The method of claim 5, wherein when the IPV6 address is the IPV6 interface ID;
   allocating an IPV6 address for the user terminal comprises one of:

selecting an IPV6 interface ID for the user terminal based on an interface or ISP domain to which the user terminal belongs; and generating an IPV6 interface ID using a random number or a MAC address of the user terminal.

9. The method of claim 5, wherein the user terminal is an NDP user terminal, and the method comprises:

receiving an IPV6 prefix allocation request sent from the NDP user terminal;

acquiring attribute information of an IPV6 prefix of the NDP user terminal according to the IPV6 prefix allocation request, and returning an IPV6 prefix allocation acknowledgement carrying the attribute information of the IPV6 prefix to the NDP user terminal.

10. The method of claim 5, wherein the user terminal is a PPP user terminal, and the method comprises:

receiving an IPV6 prefix allocation request sent from the PPP user terminal;

acquiring attribute information of an IPV6 prefix of the PPP user terminal according to the IPV6 prefix allocation request, and returning an IPV6 prefix allocation acknowledgement carrying the attribute information of the IPV6 prefix to the PPP user terminal;

receiving an IPV6 interface ID allocation request sent from the PPP user terminal;

allocating an IPV6 interface ID for the PPP user terminal according to the IPV6 prefix allocation request, and returning an IPV6 interface ID allocation acknowledgement carrying the IPV6 interface ID to the PPP user terminal.

11. The method of claim 6, wherein the attribute information of the IPV6 prefix comprises prefix address, length, preferred lifetime, valid lifetime, and auto-configuration label.

12. The method of claim 5, wherein the user terminal comprises a DHCP user terminal, an EAP user terminal, or a L2TP user terminal.

13. The method of claim 5, wherein the method is performed by an IPV6 address management device, and the IPV6 address management device comprises a BRAS or a network server.

14. The method of claim 13, wherein when the IPV6 address management device is the network server, the method further comprises:

forwarding, by the BRAS, the IPV6 address allocation request and the IPV6 address allocation acknowledgement between the user terminal and the network server.

15. A system for allocating IPV6 address, comprising a user terminal and an IPV6 address management device;

wherein the user terminal is adapted to send an IPV6 address allocation request, and acquire an allocated IPV6 address from an received IPV6 address allocation acknowledgement; and the IPV6 address management device is adapted to receive the IPV6 address allocation request, allocate the IPV6 address according to the IPV6 address allocation request, and send the IPV6 address allocation acknowledgement carrying the allocated IPV6 address to the user terminal;

wherein the IPV6 address comprises at least one of an IPV6 prefix and an IPV6 interface identification;

wherein the IPV6 prefix is determined by the allocation module based on an interface or Internet Service Provider (ISP) domain to which a user terminal containing the request module belongs; and the IPV6 interface ID is selected by the allocation module based on the interface or the ISP domain to which the user terminal belongs.

16. The system of claim 15, wherein the IPV6 address management device comprises a network server or a BRAS.

17. The system of claim 15, wherein the IPV6 address management device is a network server;

the system further comprises a BRAS, adapted to forward the IPV6 address allocation request and the IPV6 address allocation acknowledgement between the user terminal and the network server.

18. The method of claim 5, wherein when the IPV6 address is the IPV6 interface ID, allocating an IPV6 address for the user terminal comprises:

allocating the IPV6 interface ID for the user, wherein the IPV6 interface ID for the user is different from another IPV6 interface ID for another user.

19. A system for allocating IPV6 address having an IPV6 address management device comprising an allocation module adapted to (1) receive the IPV6 address allocation request from a user terminal, (2) allocate the IPV6 address according to the IPV6 address allocation request, and (3) send the IPV6 address allocation acknowledgement carrying the allocated IPV6 address to the user terminal;

wherein the IPV6 address comprises at least one of an IPV6 prefix and an IPV6 interface identification;

wherein the IPV6 prefix is determined by the allocation module based on an interface or Internet Service Provider (ISP) domain to which a user terminal containing the request module belongs; and the IPV6 interface ID is selected by the allocation module based on the interface or the ISP domain to which the user terminal belongs.

* * * * *